Figure 1:
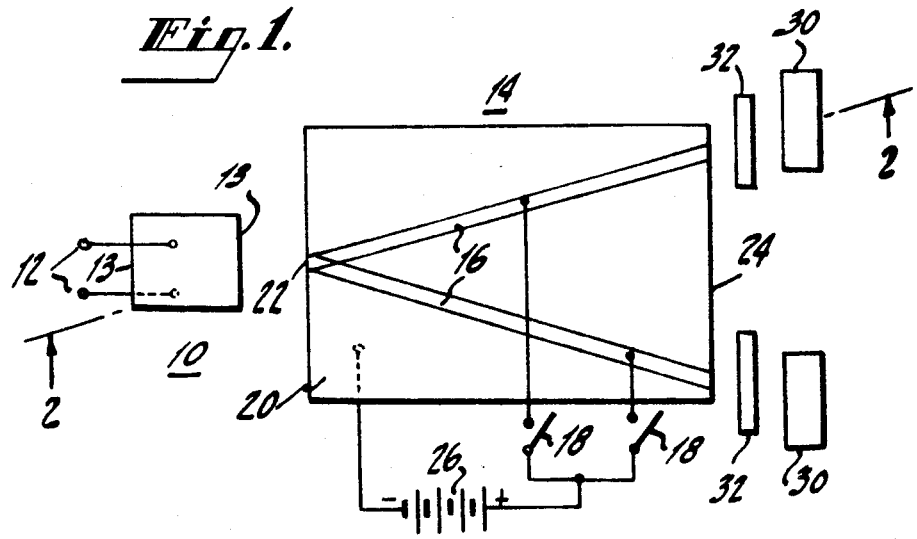

May 16, 1967　　　　H. JOHNSON　　　　3,320,013
SELECTIVELY CONTROLLABLE LIGHT GUIDE APPARATUS
Filed June 3, 1963

INVENTOR
HARNICK JOHNSON
BY J. C. Whittaker
ATTORNEY

United States Patent Office 3,320,013
Patented May 16, 1967

3,320,013
SELECTIVELY CONTROLLABLE LIGHT GUIDE
APPARATUS
Harwick Johnson, Princeton, N.J., assignor to Radio Corporation of America, a corporation of Delaware
Filed June 3, 1963, Ser. No. 285,122
4 Claims. (Cl. 350—1)

This invention relates to an improved light apparatus or system. In particular, this invention relates to an improved method of and means for spatially guiding or deflecting a beam of light, such as a laser beam, from one predetermined location to another. The device is especially useful for switching in an optical computer type device.

The term laser is a name used to refer to a device which provides "light amplification by stimulated emission of radiation." The laser device is commonly used as a well collimated source of coherent light.

It has been suggested that a coherent light beam, such as that provided by a laser, could be used for many computer applications if the light beam could suitably be spatially guided or deflected. For example, if the laser beam could be guided from one location to another, different light detectors could be positioned at each of the locations to record the presence or absence of the beam. Thus, a system for recording the presence, or absence, of an information bit would be provided.

Prior mechanical systems, for spatially deflecting a light beam, have been limited to relatively low deflection frequencies due to the inertia of the necessary mechanical movement.

It is, therefore, an object of this invention to provide a new and improved means for spatially deflecting or guiding a light beam.

It is another object of this invention to provide a novel means, free of any mechanical moving parts, for guiding a laser beam.

A further object of this invention is to provide an improved method of and means for electrically guiding a light beam at a high rate of speed.

These and other objects are accomplished in accordance with this invention by providing a beam of light which is directed into a light deflecting or guiding body. The guiding body is made of a material having a band gap substantially matching the photon energy of the light beam that is used. The guiding body includes a plurality of fan-shaped regions, or guides, throughout which the index of refraction may be electrically controlled. Since the regions are fan-shaped, and the light beam is directed into the stem of the fan, any radially extending region may be selectively electrically controlled to pass, or to prohibit passage of the light beam. By arranging a different light detector adjacent to the ends of each of the various fan-shaped regions of the light deflector, the light beam may effectively be switched from one or more selected detectors to any other selected detector or detectors. In an embodiment of the invention, the light deflector is a semiconductor body having a plurality of radially extending, line like, P-N junctions therein. The line junctions may be formed in curved lines so that the light beam is gradually deflected. In this case, the radius of curvature should be much greater than the wavelength of the light. The index of refraction of each junction region, may be electrically controlled by forward biasing the junctions.

Figure 2:
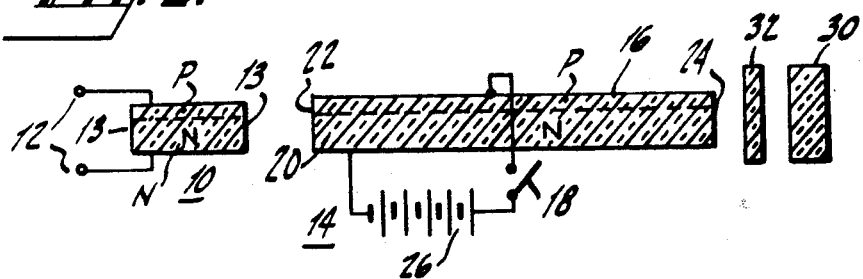

The invention will be described in greater detail by reference to the accompnying drawings wherein:

FIG. 1 is a partially schematic top view of a light deflection system embodying this invention; and, FIG. 2 is a sectional view taken along line 2—2 of the embodiment illustrated in FIG. 1.

FIG. 1 shows a laser device 10 for producing a beam of coherent light radiation. The laser device 10 comprises a suitably doped gallium arsenide P-N junction. Other sources of substantially monochromatic light may be used, and the light beam need not be a coherent beam. Also, other types (gases or solids) of lasers may be used as a source of coherent radiation. The gallium arsenide P-N junction laser is illustrated, and is preferred, due to its relatively small size, relatively high brightness level, and its property of producing a well focussed substantially monochromatic light beam, which are desirable attributes for computer applications.

The gallium arsenide laser 10 is known in the art, and is known to emit coherent radiation when electrically pumped by means of potentials applied to terminals 12. The radiation produced by the laser 10 is radiation at a wavelength of approximately 8500 A.

The gallium arsenide P-N junction laser 10 is positioned in an optical cavity that is formed by the flat parallel ends 13 of the laser body. This optical cavity is produced due to the fact that the index of refraction of the laser 10 is substantially different from the index of refraction of the air surrounding the laser 10. Thus, the interface between the laser 10 and air forms a partially reflecting surface which is sufficient to act as the ends of the resonant cavity.

Spaced adjacent to the laser 10 is a light deflecting, or light guiding, device 14 which comprises a semiconductive body 20 having a plurality of fan like regions 16 therein. The regions 16 are regions which may have their index of refraction controlled by electrical signals applied to the separate regions by means of a plurality of switches 18.

The guiding or deflecting member 14 is made of a material having a bandgap substantially equal to the photon energy of the light emitted by the laser 10. In other words, $$h\nu \approx E_g \tag{1}$$

where:

$h$ is Plancks constant
$\nu$ is the frequency of the emitted light
$E_g$ is the bandgap of the deflecting medium Thus, for each substantially different wavelength of laser light, determined by the material selected as the laser 10, a different material should be used as the deflecting medium. Laser materials, their wavelengths, and corresponding suitable deflecting mediums are as follows:

| Laser Material | Wavelength | Deflecting Material |
|---|---|---|
| GaAs | 8,500 | GaAs. |
| InP | 10,300 | InP. |
| CaF$_2$:Dy$^{3+}$ | 23,600 | InAs-18% GaAs. |
| CaWO$_4$:Nd$^{3+}$ | 10,600 | GaSb-67% GaAs. |
| Al$_2$O$_3$:Cr$^{3+}$ | 6,900 | GaAs-33% GaP. |

As an example, when using a gallium arsenide laser 10 as a light source, the deflecting medium 14 may comprise a body portion 20 of a semiconductor material such as gallium arsenide. Deposited in the body portion 20 is a plurality, two are shown, of P-N junctions 16 which are radially extending or are in a fan-shaped array. Thus, the junctions 16 are co-extensive or juxtaposed at the end 22 adjacent to the laser 10. At the other end, i.e. the end 24 remote from the laser 10, the junctions 16 are substantially spaced apart in a roughly fan-shaped array. Thus, light which enters the junctions 16 on the end 22 passes down one or more of the line type junctions 16, when the junctions are energized by closing the corresponding switch to forward bias the corresponding junction. The light passing along one of the junctions is emitted at the end 24 in one or more predetermined directions. The body portion 20 may be approximately 1 cm. long while the P-N junction 16 may be approximately 0.1 mm. wide.

The line type junctions 16 may be formed by diffusion of P-type impurities, for example, such as zinc or cadmium, into N-type substrates. The line geometry is attained by utilizing masking techniques which are well known in the transistor technology art. Alternatively, N-type impurities, such as Sn, Se, Te, may be diffused into a P-type substrate.

The optical properties of each of the line type, semiconductor P-N junctions 16 are determined by the complex dielectric constant of the junctions. The complex dielectric constant may be modulated by modulating the carrier density of the junctions 16. The carrier density in the junction 16 is modulated by applying a forward bias to the junctions which can be readily adjustable by presently known means such as switches 18.

During operation of the deflecting device 14, as the number of injected carriers is increased in the region just around and including the P-N junctions, the device 14 produces photons. As the number of injected carriers is further increased, each of the P-N junctions 16 produces laser action. At some photon level before the laser action producing point, the region near the junction will become a region having a higher index of refraction than adjacent regions of the body 14. Thus, this higher index region functions in a manner similar to a dielectric wave guide, with substantially all of the electromagnetic energy confined to the junction region by virtue of the dielectric discontinuity now existing between the junction and the adjacent regions. Thus, light which enters one end of a junction is retained in this lower index area, probably by multiple internal reflections, and is "directed" out the other end of this junction. The directed light has substantially no spread into regions adjacent the energized P-N junction.

Assuming a gallium arsenide P-N junction of the size described above, a potential approximately equal to the bandgap of the material, i.e. 1.4 volts for gallium arsenide, produces the "optical tunneling" action in the junction region. For other materials, other energy levels may be required.

Suitable light detectors 30 such as photocells or photosensitive P-N junctions, may be positioned at predetermined locations adjacent to each of the ends of the light conducting or directing channels 16 in the light deflector 14. By properly switching between the fan-shaped light conducting channels 16, the detectors 30 may be energized in any desired combination and/or sequence. Usually, light from a laser is polarized light. Therefore, in order to prevent light other than that from the laser 10 from entering the detectors 30, a polarizing filter 32 may be positioned between the detectors 30 and the body 14. Polarizing filters are known, and the filters 32 may be of any conventional type such as a polaroid glass or a Nicoll prism for example.

Although the simplicity of the arrangement illustrated is desirable, other fan-shaped structures may be utilized if desired. For example, the laser 10 may be positioned substantially at the hub of a wheel of radially extending electrically controlled light conducting channels. The light conducting channels 16 may be in shapes other than fan-shaped. For example, the line like junctions may be gradually curved.

Although only two P-N junction channels have been illustrated, any number of channels may be utilized to switch the light between any desired number of detectors 30. Also, it should be understood that the light may be directed to more than one detector at a time. Furthermore, a plurality of light deflectors 14 may be optically cascaded if desired.

Although the light source has been described as a laser 10, other non-coherent sources of substantially monochromatic radiation may be used. Although only carrier injection has been described as a method of "switching" between light conducting channels, other known methods of varying the carrier density to produce the "optical tunnel" may be used.

The laser 10, the switching device 14 and the detectors 30 are shown as being spaced apart. When desired, these elements may be positioned in abutting relationship, with suitable electrical insulation, to avoid light losses.

What is claimed is:
1. Selectively controllable light guide apparatus comprising a semiconductor body substantially transparent to light of a given wavelength and normally having a predetermined index of refraction for light of said given wavelength, said body including a plurality of individual separate P-N junction regions extending from a common point, and control means for selectively injecting sufficient carriers in the vicinity of any particular P-N junction region to cause the index of refraction of that particular P-N region to exceed said predetermined index of refraction, whereby a P-N junction is effective as a light guide solely in response to said sufficient carriers being injected in the vicinity thereof.

2. The apparatus defined in claim 1, further including a light source oriented in cooperative relationship with said common point for applying a light beam of said given wavelength as an input to all of said plurality of P-N junction regions, and individual light detector means corresponding to each separate one of said plurality of P-N junctions, each individual light detector means being oriented in cooperative relationship with the end distal to said common point of that P-N junction with which it corresponds.

3. The apparatus defined in claim 1, wherein said body comprises a substrate formed of one type conductivity in which is located channels of opposite type conductivity, said channels forming a fan-shaped configuration and said common point being located at the stem of said fan.

4. The apparatus defined in claim 1, wherein said control means comprises means for selectively forward biasing each of said P-N junction regions.

No references cited.

JEWELL H. PEDERSEN, *Primary Examiner.*

W. L. SIKES, *Assistant Examiner.*